(12) United States Patent
Seo

(10) Patent No.: US 6,341,117 B1
(45) Date of Patent: Jan. 22, 2002

(54) APPARATUS AND METHOD FOR CONTROLLING POWER OF LASER DIODE USED FOR OPTICAL RECORDING MEDIA

(75) Inventor: Jin-Gyo Seo, Seoul (KR)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/209,457

(22) Filed: Dec. 11, 1998

(30) Foreign Application Priority Data

Dec. 11, 1997 (KR) ............................................. 97/67676

(51) Int. Cl.$^7$ .............................................. G11B 7/007
(52) U.S. Cl. ...................................... 369/116; 369/47.5
(58) Field of Search ........................... 369/116, 54, 59, 369/13, 106, 124.01, 47.5, 59.12

(56) References Cited

U.S. PATENT DOCUMENTS

| | | | |
|---|---|---|---|
| 4,788,674 A | * 11/1988 | Maeda et al. .................. | 369/54 |
| 5,050,156 A | * 9/1991 | Barton ......................... | 369/116 |
| 5,327,411 A | * 7/1994 | Iwasa et al. .................. | 369/59 |
| 5,513,167 A | * 4/1996 | Udagawa et al. ............ | 369/116 |
| 6,018,508 A | * 1/2000 | Hasegawa .................... | 369/124 |
| 6,058,077 A | * 5/2000 | Miyaoka ....................... | 369/13 |

* cited by examiner

Primary Examiner—David Hudspeth
Assistant Examiner—Kim-Kwok Chu
(74) Attorney, Agent, or Firm—Staas & Halsey LLP

(57) ABSTRACT

An apparatus and method for controlling power of a laser diode used for optical recording media. The apparatus and method for controlling power of a laser diode used for optical recording media controls diode power in parallel in order to independently control each power level required for recording onto an optical recording medium so that laser diode power can be stably controlled with respect to both the case of reading information from and recording information onto the optical recording medium. According to the apparatus and method for controlling power of the laser diode in the optical recording media, the power of the laser diode in the case of reading information from and recording information onto the optical recording media is controlled stably by controlling the diode power in order to independently control each power level required for recording onto the photo diode in parallel. Accordingly, the application of the optical recording media can be maximized and the marketability can be increased.

6 Claims, 3 Drawing Sheets

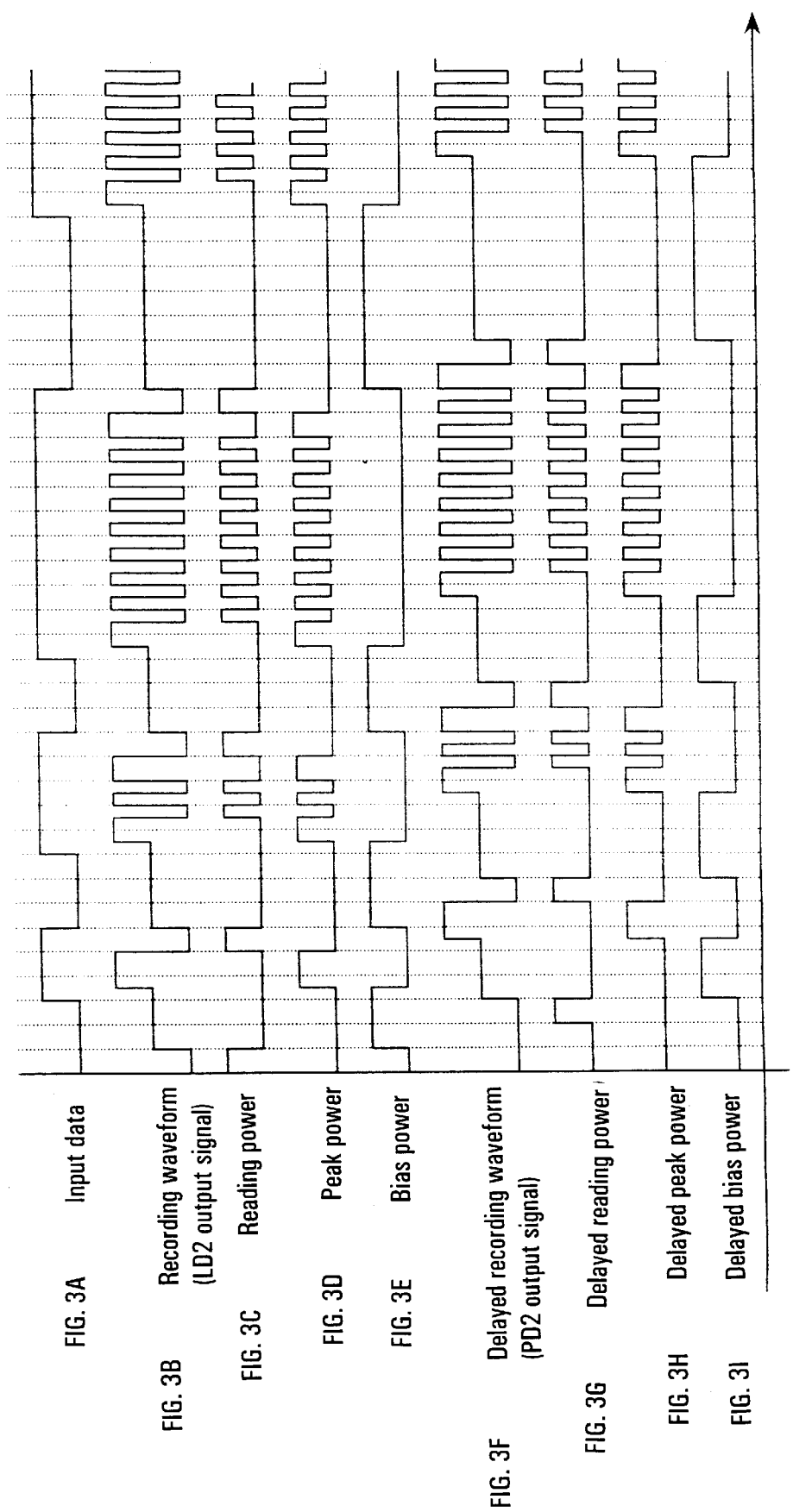

APPARATUS AND METHOD FOR CONTROLLING POWER OF LASER DIODE USED FOR OPTICAL RECORDING MEDIA

CROSS-REFERENCE TO RELATED APPLICATIONS

This application claims the benefit of Korean Application No. 67676/1997, filed Dec. 11, 1997, in the Korean Patent Office, the disclosure of which is incorporated herein by reference.

BACKGROUND OF THE INVENTION

1. Field of the Invention

The present invention relates to an apparatus and method for controlling power supplied to a laser diode, and more particularly, relates to an apparatus and method for controlling power of a laser diode used for optical recording media in which diode power is controlled in parallel to independently control power levels required for recording onto optical recording media so that laser diode power can be stably controlled with respect to reading information from and recording information onto the optical recording media.

2. Description of the Related Art

Recording media having a high recording capacity are required in the present information and multimedia age. An optical recording medium such as a digital video diskread only memory(DVD-ROM) is used as a recording medium having such high capacity. The performance of high capacity recording media is determined by controlling power of the laser diode to an utmost condition.

The apparatus and operation for controlling laser diode power, used for the current optical recording media, will be described hereinafter with reference to FIG. 1.

As shown in FIG. 1, the apparatus for controlling laser diode power includes: an interface unit 10 for controlling an interface with an external processor; a power level decoding unit 20, enabled by an enable signal from the interface unit 10, for executing decoding by receiving an address relating to one of the optical recording media from the interface unit 10, multiplexing the data corresponding to the target power level, and outputting the same; a power level control unit 30 for receiving an input/output command from the interface unit 10, receiving the data corresponding to the power level from the power level decoding unit 20 and converting the power level; a pulse generating unit 40 for generating a pulse having a predetermined form based on input data from the interface unit 10; an automatic diode power control unit 50 for maintaining an output level of the diode by converting the data corresponding to the power level from the power level decoding unit 20 into analog data; a laser diode driving unit for generating a laser diode driving signal based on a signal from the automatic diode power control unit 50 and a pulse outputted from the pulse generating unit 40; a laser diode LD1 having an anode which receives the driving signal from the laser diode driving unit 60 and a cathode which is grounded; a photo diode PD1, which is driven by the laser diode, having an anode connected to the power VCC and which outputs the output control signal of the laser diode via a cathode to the automatic diode power control unit 50; and a clock oscillating unit 70 for generating a clock for operation of the power level control unit 30.

The interface unit 10 is controlled by commands, transmitted from the external processor. The power level decoding unit 20 is enabled by an enable signal outputted from the interface unit 10 and receives the power level of the target laser diode from the interface unit 10, executes demultiplexing, with a register, and outputs the power level as digital data to the automatic diode power control unit 50. The automatic diode power control unit 50 receives the data corresponding to the power level of the laser diode, executes analog/digital converting and outputs a signal corresponding to the difference of power levels between the signal input from the cathode of the photo diode PD1 and the power level, input from the power level decoding unit. The pulse generating unit 40 generates a pulse of a predetermined type based on input data from the interface unit 10. The laser diode driving unit 60 drives the laser diode LD 1 by using the pulse, generated from the pulse generating unit 40, and the signal, generated from the automatic diode power control unit 50.

In the mean time, the power level control unit 30 receives the main clock from the clock oscillating unit 70, divides and outputs the clock to the pulse generating unit 40. The power level control unit 30 receives the data corresponding to the power level from the power level decoding unit 20 when an input/output command is received from the interface unit 10, and converts the data and outputs a signal to the automatic diode power control unit 50.

But, in the above-described apparatus for controlling laser diode power, during the laser diode is controllable when the power level value is constant, such as reading. However, the laser diode is not controllable across three power levels such as reading, peak and bias power levels, such as are required for recording information onto the optical media.

SUMMARY OF THE INVENTION

Therefore, it is an object of the present invention to provide an apparatus and method for controlling power of a laser diode used in conjunction with an for optical recording media in which a diode power is controlled in parallel to independently control each of the power levels required for recording onto an optical recording medium so that laser diode power can be stably controlled with respect to both reading information from and recording information onto the optical recording medium.

To solve the above-mentioned object, according to the present invention, the apparatus and method for controlling power of the laser diode controls the power of a laser diode stably with respect to both reading from and recording onto the optical recording media by controlling the diode power in parallel to independently control each power level required for recording onto the optical recording media, and, as such, is different from the prior art which controls only one laser diode power level.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the like components, wherein:

FIGS. 3A through 3I are operational timing charts of the apparatus shown in FIG. 2 [and according to the embodiment of the present invention].

Reference will now be made to the details of the preferred embodiments of the present invention, examples of which are illustrations in the attached drawings.

Figure 1:
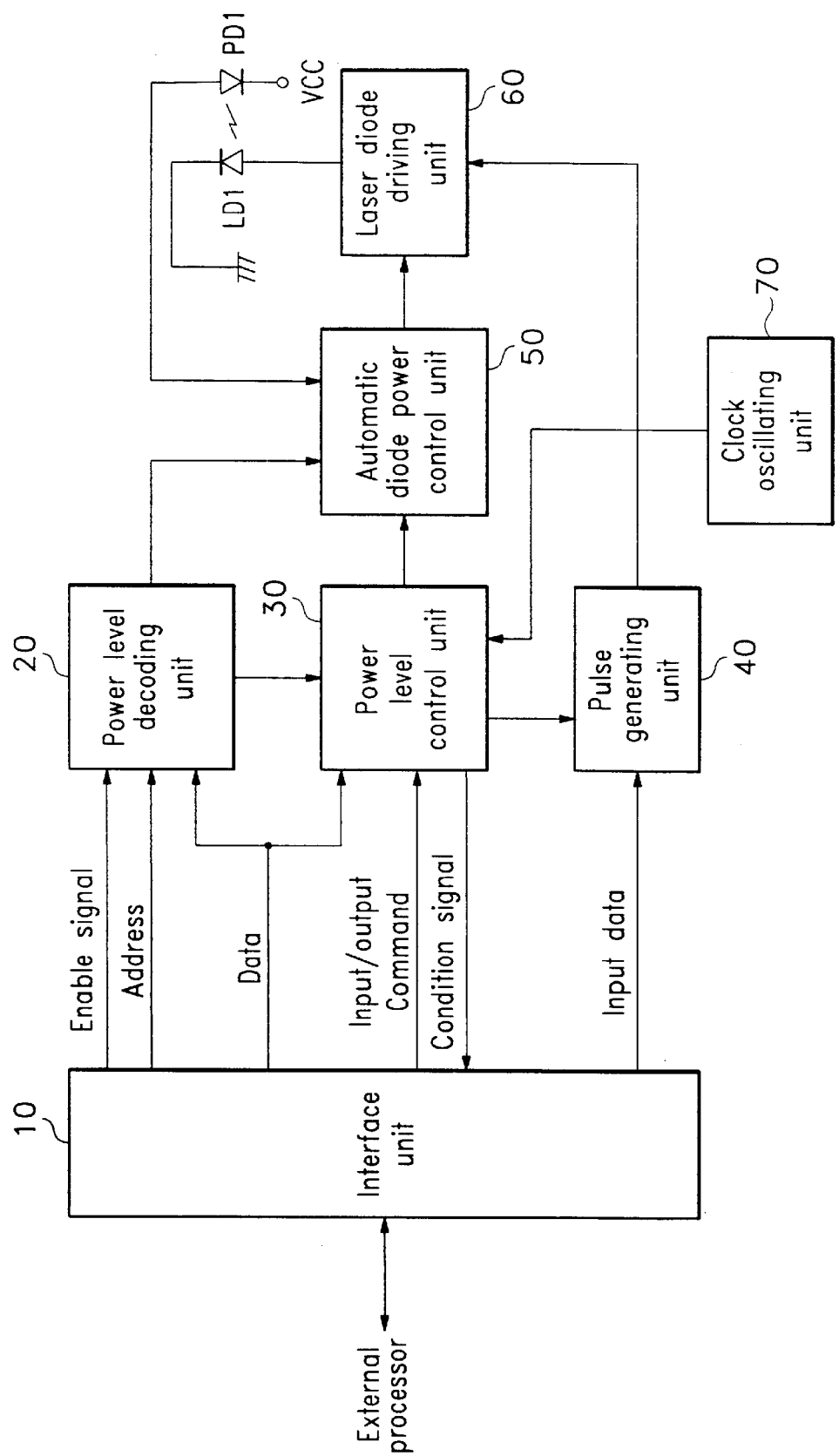
FIG. 1 is a detailed block diagram of an apparatus for controlling power of a diode in an optical recording apparatus according to one related art.
Figure 2:
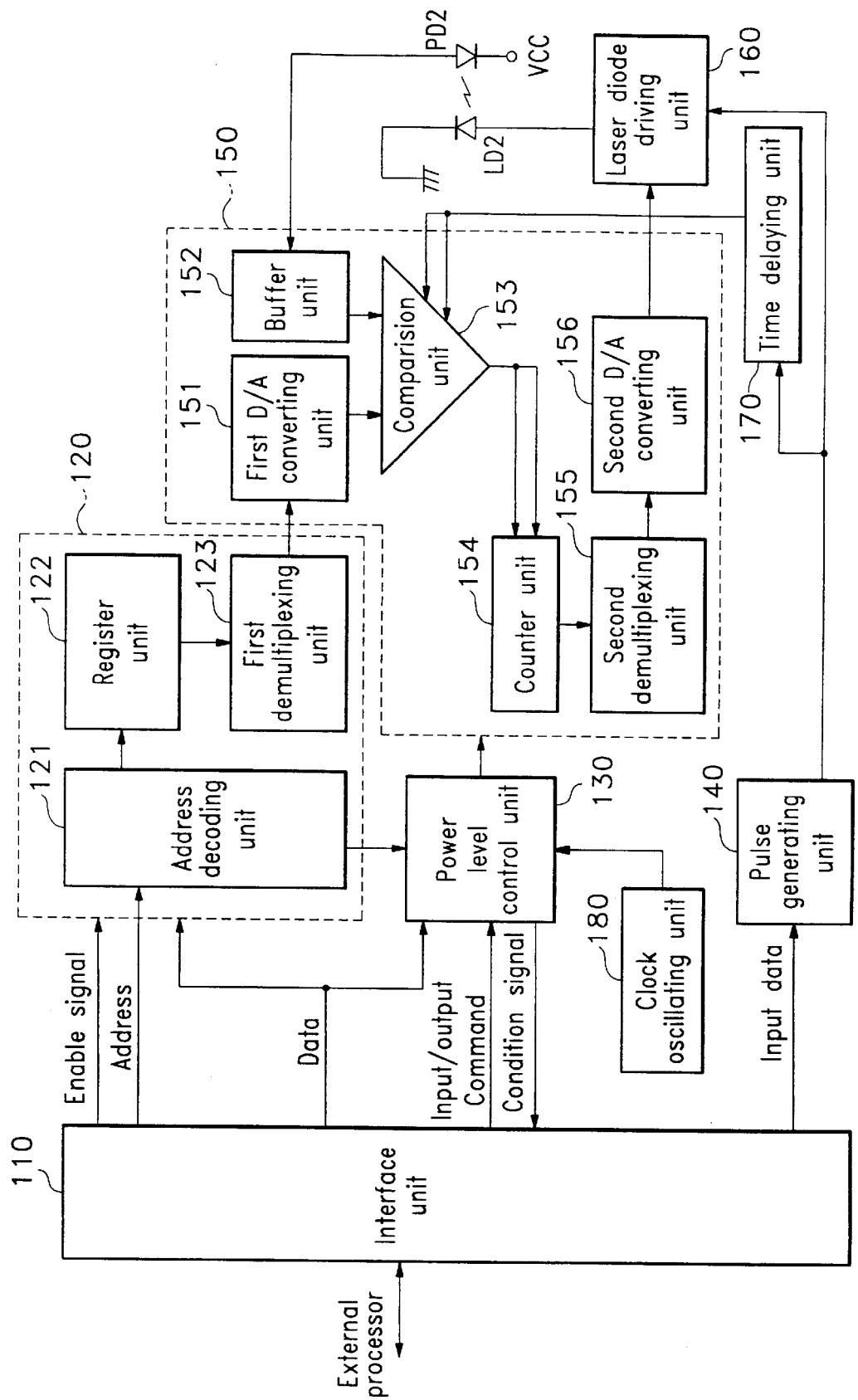
FIG. 2 is a detailed block diagram of an apparatus for controlling power of a diode in an optical recording apparatus according to an embodiment of the present invention.

FIG. 2 is a block diagram of an apparatus for controlling power of a laser diode in optical recording media according to the present invention. As shown in FIG. 2, the apparatus for controlling power of the laser diode in optical recording media according to the present invention includes an interface unit 110 that controls an interface with an external processor along with a power level decoding unit 120, enabled by an enable signal from the interface unit 110, that executes decoding based on an address from the interface unit 110, executes demultiplexing of received data, corresponding to target power levels and outputs the demultiplexed data. A power level control unit 130 that receives an input/output command from the interface unit 110 and data corresponding to the target power levels from the power level decoding unit 120. The power level control unit 130 converts a power level of the data based on the received signals. A pulse generating unit 140 that generates a predetermined type of pulse based on input data from the interface unit 110. A time delaying unit 170 delays the input data outputted from the pulse generating unit 140. An automatic diode power control unit 150 that converts the data corresponding to each target power level from the power level decoding unit 120 into analog data and keeps an output level of a photo diode stable by selecting a required power level using the time delayed input data from the time delaying unit 170. A laser diode driving unit 160 generates a driving signal for a laser diode LLD2 based on a power level compensating signal from the automatic diode power control unit 150 and the pulse outputted from the pulse generating unit 140. The laser diode LD2 has an anode which receives the driving signal from the laser diode driving unit 160 and a cathode which is grounded. A photo diode PD2, driven by the laser diode, has an anode connected to a power source VCC and outputs a signal for controlling the output of the laser diode, via a cathode thereof, to the automatic diode power control unit 150. Finally, a clock oscillating unit 180 is provided that generates a clock for operation of the power level control unit 130.

The power level decoding unit 120 includes an address decoding unit 121 which decodes an address inputted from the interface unit 110 and outputs the decoded address to the power level control unit 130 when an appropriate command is given. A register unit 122 is provided for temporarily recording the data corresponding to the power level determined by the address decoding unit 121. A first demultiplexing unit 123 demultiplexes each power level from the register unit 122 and outputes a demultiplexed power level to the automatic diode power control unit 150.

The automatic diode power control unit 150 includes a first D/A converting unit 151 which receives the data corresponding to a reading, a peak and a bias power levels from the power level decoding unit 120. The first D/A converting unit 151 generally comprises a plurality of DIA converters, connected in parallel which convert data into an analog level. A buffer unit 152 is provided for buffering the signal inputted from the photo diode PD2. A power level comparison unit 153 compares an output of the buffer unit 152 with the analog power level output from the first D/A converting unit 151 in parallel and outputs a selected power level difference by receiving the input data which determines the power level from the time delaying unit 170. A counter unit 154, comprising a plurality of counters, converts the power level difference into a digital value by counting lay up/down value corresponding to each power level difference inputted from the power level comparison unit 153. A second demultiplexing unit 155 receives data corresponding to the power level difference outputted from the counter unit 154, demultiplexes and subsequently outputs the data. A second D/A converting unit 156 is provided for converting each signal inputted from the second demultiplexing unit 155 into an analog signal indicating of a power level.

The operation of the above-described apparatus for controlling power of the laser diode will be described hereinafter with reference to FIGS. 2 and 3A–3I.

As shown in FIGS. 3A through 3I, the pulse is separately controlled with respect to each power level because the pulse for recording onto the optical recording media has three power level values. The three power levels can comprise a plurality of respectively similar levels. The interface unit 110 controls the interface by receiving the command from the external processor and outputs the enable signal of the reading, the peak and the bias power levels to the power level decoding unit 120. Then, the power level decoding unit 120 keeps the power level stably by latching the data corresponding to the predetermined power level by using the register unit 122.

The interface unit 110 outputs the reading (FIG. 3C), the peak (FIG. 3D) and the bias (FIG. 3E) power signals, as shown in FIG. 3, to the automatic diode power control unit 150 via the power level decoding unit 120 using a demultiplexing operation. The power levels are inputted into the first D/A converting unit 151 of which is consisted of a plurality of D/A converters as reference value.

In the mean time, the signal, outputted from the photo diode PD2, is inputted into the comparison unit 153 via the buffer unit 152. The comparison unit 153 separately receives a predetermined reference power level outputted from the first D/A converting unit 151 and the signal of the photo diode PD2 from the buffer unit 152. The comparison unit 153 subsequently receives the generated pulse from the pulse generating unit 140, delays and applies the same as a control input of the comparison unit 153. At this time, the time delay is set to the same time delay outputted and fed back to the photo diode PD2.

According to the control of the time-delayed pulse, the comparison unit 153 outputs a value which compares the two input signal to the counter unit 154. Because the predetermined value in the counter unit 154 is different from the reference power level, the counting value is increased or decreased by the signal outputted from the counter unit 154. According to each reference value, the counting is processed in parallel as the counter unit 154 consists of a plurality of counters. Then, the signal outputted from the counter unit 154 is selected by the second demultiplexing unit 155, converted into an analog signal via the second D/A converting unit 156 and transmitted to the laser diode driving unit 160. According to each power level, the laser diode driving unit 160 outputs the power level such as a recording waveform of FIG. 3B, to the laser diode LD2 by using the input data input from the pulse generating unit 140.

Concurrently, the power level control unit 130 executes functions such as turning on or resetting the laser diode LD2, setting the laser power level and controlling overall functions.

In the operational timing chart as shown in FIGS. 3A through 3I, FIG. 3A shows input data of nonreturn-to-zero (NRZI) type which is input into the pulse generating unit 140. FIG. 3B shows a recording waveform, for recording onto the optical recording media, as input into the laser diode LD2. FIGS. 3C through 3E show signals for controlling the reading, the peak and the bias powers, respectively, which are input into the detected laser diode driving unit 160 for generating recording waveforms. FIG. 3F shows a signal from the photo diode PD2, subsequently input into the comparison unit 153, via the buffer unit 152. FIG. 3G sjows a signal for controlling the reading power as output from the time delaying unit 170. FIG. 3H shows a signal for controlling the time delayed peak power. Finaly, FIG. 3I is a signal for controlling the time delayed bias power and for controlling the operation of the comparison unit 153. The respective power levels are continuously input to the signal detected from the photo diode (PD2), as shown in FIG. 3F. This is for selectively operating the comparison unit 153 exclusively in the relevant section. For fulfilling the requirements of this embodiment, the number of comparison units may be increased.

The method of controlling power of a laser diode in conjunction with an optical recording media, according to the present invention, includes: an interfacing step of controlling the interface with an external processor via an interface unit 110; a power level decoding step of receiving and decoding an address from the interface unit 110, after being enabled by receiving an enable signal from the interface unit 110,and outputting the power level decoding data corresponding to each power level by receiving and demultiplexing data corresponding to the target power level; a power level control step of receiving the input/output command from the interface unit 110 and the data corresponding to the power level and converting the power level; a pulse generating step of generating a first pulse having a predetermined waveform by receiving an input data from the interface unit 110; a time delaying step of delaying time by receiving the first pulse; a diode power control step of keeping the power level of the photo diode PD2 constant by converting the power level decoding data input via the diode power control unit into the analog type and selecting the required power level by using the time delayed first pulse; a laser diode driving step of generating a driving signal for the laser diode LD2 by receiving a power level compensating signal from the diode power control unit 150 and the first pulse; and a photo-converting step of photo-converting the output of the laser diode, via a photo converting unit, and outputting the converted output to the diode power control unit 150.

The power level decoding step includes: an address decoding step of decoding the address inputted from the interface unit 110 and outputting the decoded address for controlling the power level in case that the command is given; a registering step of temporarily recording the data corresponding to the power level determined by the address decoding unit 121; and a first demultiplexing step of demultiplexing each power level from the register via the first demultiplexing unit 23 and outputting the demultiplexed power level to the diode power control unit 150.

The diode power control step includes: a first D/A converting step of receiving and converting each data corresponding to the reading, the peak and the bias power levels into the analog level by connecting a plurality of D/A converting units 151 in parallel; a buffering step of keeping the signal inputted from the photo converting unit constantly in the buffer; a power level comparing step of comparing the output of the buffer with the analog power level from the D/A converting unitS 151 in parallel and outputting the selected power level difference by receiving the time delayed first pulse; a counting step of converting the power level difference into the digital type by counting up/down value corresponding to each power level difference via the counter unit 154; a second demultiplexing step of receiving and demultiplexing data outputted from the counter unit 154 and corresponding to the power level difference via the second demultiplexing unit, and outputting the demultiplexed data; and a second D/A converting step of converting each signal inputted from the second demultiplexing unit into an analog type of the power level.

The method will now be discussed with reference to FIGS. 3A through 3I. First, as shown in FIGS. 3A through 3I, the pulse is separately controlled with respect to each power level because the pulse for recording onto the optical recording media has three power level values. When the interfacing step controls the interface by receiving the command from the external processor via the interface unit 110, the power level decoding step outputs the enable signals of the reading, the peak and the bias power levels.

Then, the power level decoding step keeps the value stably by latching the data corresponding to the predetermined power level by using a register. And, the interfacing step outputs the reading, the peak and the bias power signals, which are as shown in FIGS. 3C through 3E, to the diode power control unit by demultiplexing. The power levels are inputted into a plurality of the first D/A converting units 151 as reference values.

In the mean time, the photo converting step inputs the signal outputted from the photo converting unit PD2 into the comparison unit 153 via the buffer unit 152 and the power level comparing step compares the predetermined reference power level outputted from the first D/A converting unit 151 with the output of the buffer unit 152.

The pulse generating step generates the first pulse according to the input data and the time delaying step delays the first pulse during the predetermined time by receiving the first pulse. At this time, the exact control is executed by setting the time for delaying the first pulse to the same as the delayed time in the photo converting step.

In the mean time, the power level comparing step counts the compared value between two input signals, that is the reference power level from the first D/A converting unit 151 and the output of the buffer unit 152, by the control of the time delayed first pulse. According to the outputted signal from the comparison unit 153, the counting value is increased or decreased because the predetermined value in the counter is different from the reference power level. The counting step, using a counter unit 153 is consisting of a plurality of counters, is processed in parallel according to the reference value. Consequently, the signal outputted from the counter unit 153 is selected by the second demultiplexing unit 155, converted into the analog signal by the second D/A converting unit 156 and transmitted to the laser diode driving unit 160. Then, according to each power level, the laser diode driving step outputs the power level having the type of the recording waveform as shown in FIG. 3B, to the photo converting unit PD2 via the laser diode LD2, using the received input data. In the mean time, the power level control step executes functions such as turning on or resetting the laser diode LD2 and setting the laser power level while executing overall control.

As above-mentioned, according to the apparatus and method for controlling power of the laser diode in the optical recording media, the power of the laser diode, when reading from and recording onto the optical recording media, is controlled by controlling the diode power to independently control each power level required for recording onto the photo diode in parallel. Accordingly, use of the optical recording media can be maximized and the marketability can be increased.

As the terms mentioned in the specification are determined based upon the function of the present invention, and they can be changed according to the intention of one of ordinary skill in the art or a usual practice, the meaning of such terms should be determined considering the overall contents of the specification of the present invention.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for controlling power to a laser diode in optical recording media, the apparatus comprising:

a photo diode;

a laser diode;

an interface unit that interfaces with an external processor;

a power level decoding unit that decodes an address relating to one of the optical recording media from said interface unit, and demultiplexes data corresponding to target power levels;

a power level control unit, driven by a clock signal, that receives the data corresponding to the target power levels from said power level decoding unit and outputs a signal indicative of each of the target power levels;

a pulse generating unit generating a predetermined type of a pulse upon receiving data from said interface unit;

a time delaying unit delaying the pulse output by said pulse generating unit;

an automatic diode power control unit that converts the data corresponding to each target power level from said power level decoding unit into analog data and keeps an output level of said laser diode stable by selecting a required power level using the time delayed output from said time delaying unit and outputting a power level compensation signal; and a laser diode driving unit that generates a driving signal for said laser diode based on the power level compensating signal from said automatic diode power control unit and the pulse outputted from said pulse generating unit.

2. The apparatus for controlling power of the laser diode as set forth in claim 1, wherein said power level decoding unit comprises:

an address decoding unit which decodes an address inputted from said interface unit and outputs the decoded address to said power level control unit;

a register unit for temporarily recording the data corresponding to a power level determined by said address decoding unit; and a first demultiplexing unit for demultiplexing each power level from said register unit and outputting the demultiplexed power level to said automatic diode power control unit.

3. The apparatus for controlling power of the laser diode as set forth in claim 1, wherein said automatic diode power control unit comprises:

a first D/A converting unit, which receives data corresponding to a reading, a peak and a bias power levels from said power level decoding unit, including a plurality of D/A converters connected in parallel which convert the data into an analog signal;

a buffer unit for buffering the signal inputted from said photo diode; a comparison unit which, in parallel, compares an output of said buffer unit with the analog signal from said first D/A converting unit and outputs a selected power level difference by receiving input data, from said time delay unit, which determines the power level;

a counter unit for converting the power level difference into digital by counting an up/down value corresponding to each power level difference from said power level comparison unit;

a second demultiplexing unit which receives data corresponding to the power level difference outputted from said counter unit, demultiplexes and outputs the data; and a second D/A converting unit converting each signal inputted from said second demultiplexing unit into an analog type of a power level.

4. A method for controlling power to a laser diode in optical recording media, comprising:

outputting power level decoding data corresponding to a plurality of power levels by receiving and demultiplexing data corresponding to a target power level;

when an input/output command from an interface is received, converting the target power level into target power level decoding data;

generating a first pulse having a predetermined waveform based on an input data from the interface;

delaying the first pulse, to create a time delayed first pulse; and keeping a power level of the laser diode constant by analog converting the target power level decoding data; selecting a required power level using the time delayed first pulse; and outputting a power level compensating signal.

5. The method for controlling power of a laser diode in optical recording media of claim 4, further comprising;

decoding an address inputted from the interface unit and outputting the decoded address for controlling the power level;

temporarily recording the data corresponding to the target power level determined by the decoding step; and demultiplexing each power level and outputting the demultiplexed power level to a diode power control unit.

6. The method for controlling power of a laser diode in optical recording media of claim 4, wherein the keeping a power level of the laser diode constant further comprises:

receiving and converting each data corresponding to a reading, a peak and a bias power levels into an analog level by connecting a plurality of digital to analog converting units in parallel;

buffering the photo-converted output of the laser diode;

comparing an output of the buffer with the analog power level in parallel and outputting a selected power level difference based on the time delayed first pulse;

converting the selected power level difference into a digital type power level difference data by counting up/down value corresponding to each power level difference;

receiving and demultiplexing the digital type power level difference data via a second demultiplexing unit, and outputting the demultiplexed data; and converting each signal inputted from said second demultiplexing unit into an analog power level.

* * * * *